United States Patent
Steichen et al.

(10) Patent No.: US 11,199,359 B2
(45) Date of Patent: Dec. 14, 2021

(54) SEALING VALVE ARRANGEMENT FOR A SHAFT FURNACE CHARGING INSTALLATION

(71) Applicant: PAUL WURTH S.A., Luxembourg (LU)

(72) Inventors: Charles Steichen, Schlindermanderscheid (LU); Patrick Hutmacher, Bettembourg (LU); Paul Tockert, Berbourg (LU)

(73) Assignee: PAUL WURTH S.A., Luxembourg (LU)

( * ) Notice: Subject to any disclaimer, the term of this patent is extended or adjusted under 35 U.S.C. 154(b) by 82 days.

(21) Appl. No.: 16/349,115

(22) PCT Filed: Nov. 8, 2017

(86) PCT No.: PCT/EP2017/078541
§ 371 (c)(1),
(2) Date: May 10, 2019

(87) PCT Pub. No.: WO2018/087115
PCT Pub. Date: May 17, 2018

(65) Prior Publication Data
US 2019/0277567 A1     Sep. 12, 2019

(30) Foreign Application Priority Data
Nov. 10, 2016    (LU) ........................................ 93 298

(51) Int. Cl.
*F27B 1/20*      (2006.01)
*F16K 1/20*      (2006.01)
(Continued)

(52) U.S. Cl.
CPC .............. *F27B 1/20* (2013.01); *F16K 1/2007* (2013.01); *C21B 7/18* (2013.01); *F16K 31/043* (2013.01); *F27D 3/10* (2013.01); *F27D 2003/105* (2013.01)

(58) Field of Classification Search
CPC ........ F27B 1/20; F16K 1/2007; F16K 31/043; F16K 31/045; F16K 31/042;
(Continued)

(56) References Cited

U.S. PATENT DOCUMENTS

| | | |
|---|---|---|
| 4,071,166 A | 1/1978 | Legille et al. |
| 4,755,095 A | 7/1988 | Mailliet et al. |

(Continued)

FOREIGN PATENT DOCUMENTS

| | | |
|---|---|---|
| EP | 2000547 A2 | 12/2008 |
| WO | 2011000966 A1 | 1/2011 |

OTHER PUBLICATIONS

International Search Report dated Jan. 26, 2018 re: Application No. PCT/EP2017/078541, pp. 1-3, citing: U.S. Pat. No. 4,755,095 A and U.S. Pat. No. 9,217,606 B2.

(Continued)

*Primary Examiner* — Hailey K. Do
(74) *Attorney, Agent, or Firm* — Cantor Colburn LLP

(57) ABSTRACT

A sealing valve arrangement for a shaft furnace charging installation including a shutter that cooperates with a valve seat and a shutter-actuating device for moving the shutter between a closed position in sealing contact with the valve seat and an open position remote from the valve seat, where the shutter-actuating device includes a tilting shaft connected to the shutter, an electric motor with an output shaft connected to the tilting shaft, and a braking device associated with the electric motor, where the braking device is configured for, when engaged, preventing the output shaft of the electric motor from rotating, the shutter-actuating device further including a transmission means arranged between the output shaft of the electric motor and the tilting shaft, wherein the transmission means is configured for transmitting rotational movement of the output shaft of the electric (Continued)

motor to the tilting shaft, where the transmission means includes a backlash configured for having a predetermined amount of allowed rotation between the output shaft of the electric motor and the tilting shaft.

12 Claims, 2 Drawing Sheets

(51) Int. Cl.
*F16K 31/04* (2006.01)
*F27D 3/10* (2006.01)
*C21B 7/18* (2006.01)

(58) Field of Classification Search
CPC .... F16K 31/047; F16K 31/048; F16K 31/046; F27D 3/10; F27D 2003/105
See application file for complete search history.

(56) References Cited

U.S. PATENT DOCUMENTS

| | | | | |
|---|---|---|---|---|
| 5,876,015 | A | * | 3/1999 | Schaeffer ................ F16K 1/222 |
| | | | | 251/305 |
| 9,217,606 | B2 | | 12/2015 | Schons et al. |
| 2009/0301579 | A1 | * | 12/2009 | Wong .................... F16K 31/043 |
| | | | | 137/489 |
| 2015/0008349 | A1 | * | 1/2015 | Jackson ................. F16D 49/16 |
| | | | | 251/129.11 |
| 2016/0076597 | A1 | * | 3/2016 | Takeda ................. F02D 11/107 |
| | | | | 464/73 |

OTHER PUBLICATIONS

Written Opinion dated Jan. 26, 2018 re: Application No. PCT/EP2017/078541, pp. 1-5, citing: U.S. Pat. No. 4,755,095 A and U.S. Pat. No. 9,217,606 B2.

* cited by examiner

SEALING VALVE ARRANGEMENT FOR A SHAFT FURNACE CHARGING INSTALLATION

TECHNICAL FIELD

The present invention generally relates to a sealing valve arrangement for a shaft furnace charging installation and more specifically to an upper or lower sealing valve arrangement for preventing furnace gas loss in a blast furnace charging installation.

BACKGROUND ART

Shaft furnace charging installations of the BELL LESS TOP® type have found widespread use in industry over the last decades. An early example of such an installation is disclosed e.g. in U.S. Pat. No. 4,071,166. This installation minimizes escape of blast furnace gas from the furnace throat by operating one or more intermediate charge material storage hoppers in the manner of a sluice or airlock. To this effect, each hopper has an upper sealing valve and a lower sealing valve for sealing closure of the hopper inlet and outlet respectively. During filling of the hopper, the upper sealing valve is open whilst the lower sealing valve is closed. When material is charged from the hopper into the furnace, the lower sealing valve is open whilst the upper sealing valve is closed. U.S. Pat. No. 4,071,166 discloses a commonly used sealing valve arrangement with a flap-type valve, in which the shutter is tiltable about a single shaft. The axis of this shaft is arranged approximately on the plane of the valve seat. Since the shutter has to be completely removed from the material flow path in the open position, the arrangement according to U.S. Pat. No. 4,071,166 requires considerable space in the vertical direction.

A more compact construction of the sealing valve arrangement is suggested in EP 2 000 547, wherein a linkage drive mechanism is used for moving the shutter between a closed position in sealing contact with the valve seat and an open position remote from the valve seat. The linkage drive mechanism allows a linear and swivel movement of the shutter in order for the movement of the shutter to require less space.

While U.S. Pat. No. 4,071,166 is silent about the actuator used to move the shutter, EP 2 000 547 suggests that the actuator comprises a linear hydraulic piston, imparting a rotational movement to a tilting shaft to which the shutter is connected.

Another sealing valve arrangement is disclosed in EP 2 449 327, wherein a dual-motion shutter-actuating device is used for moving the shutter between a closed position in sealing contact with the valve seat and an open position remote from the valve seat. Again, EP 2 449 327 suggests that the actuator comprises a linear hydraulic piston.

An advantage of such linear hydraulic pistons is that, due to a permanently active hydraulic pressure, the sealing is always ensured. Also, if further sealing pressure is applied to the shutter from another pressure source, such as e.g. the shaft furnace pressure, an additional movement of the shutter is easily absorbed by the available hydraulic buffer in the hydraulic piston. A downside of such hydraulic pistons, however, is the need for a hydraulic power station and hydraulic piping, which are generally considered expensive, may cause safety risks and require regular maintenance.

Technical Problem

An object of the present invention is thus to provide a sealing valve arrangement for a shaft furnace charging installation, wherein the above disadvantages are avoided. This object is achieved by a sealing valve arrangement as claimed in claim 1.

GENERAL DESCRIPTION OF THE INVENTION

The present invention provides a sealing valve arrangement for a shaft furnace charging installation comprising a shutter that cooperates with a valve seat and a shutter-actuating device for moving the shutter between a closed position in sealing contact with the valve seat and an open position remote from the valve seat.

According to the present invention, the shutter-actuating device comprises a tilting shaft connected to the shutter, an electric motor with an output shaft connected to the tilting shaft, and a braking device associated with the electric motor. The braking device is configured for, when engaged, preventing the output shaft of the electric motor from rotating. The shutter-actuating device further comprises a transmission means arranged between the output shaft of the electric motor and the tilting shaft, wherein the transmission means is configured for transmitting rotational movement of the output shaft of the electric motor to the tilting shaft. The transmission means comprises a backlash configured for having a predetermined amount of allowed rotation between the output shaft of the electric motor and the tilting shaft.

After one of the hoppers has had its bulk material fed into the shaft furnace, a material gate at the lower opening of the hopper is shut and the lower sealing valve is moved onto its valve seat to seal the hopper from the shaft furnace pressure. Subsequently, the hopper is depressurized so that fresh bulk material can be fed into the hopper by opening the upper sealing valve. Once the hopper has been depressurized, the pressure difference between the shaft furnace and the hopper is in the region of 1 to 3 bar, preferably in the region of 1.5 to 2.5 bar. This higher pressure in the shaft furnace acts as an additional pressure pushing the shutter onto its valve seat and can easily move the shutter tighter against the valve seat. This additional movement of the shutter is transferred onto the tilting shaft of the shutter and thereby onto the shutter-actuating device. In prior art solutions where the shutter-actuating device comprises a hydraulic piston, this additional movement is absorbed by the hydraulic buffer available in the hydraulic piston.

The additional movement of the shutter due to the pressure difference between shaft furnace and hopper can hardly be avoided. Thus, it seems inconceivable that the shutter-actuating device comprises a locking means for blocking movement of the shutter-actuating device once the shutter has been brought into its sealing position.

However, this is precisely what the present invention suggests. Indeed, the shutter-actuating device of the present invention comprises an electric motor with a braking device associated therewith for stopping the output shaft of the electric motor from rotating once the shutter is in its sealing position. Once the braking device is engaged, the electric motor can be turned off, thus saving on electric power consumption. Furthermore, as the electric motor is turned off, there is no risk of it overheating and being thereby damaged.

The use of electric power instead of hydraulic power has the advantage that electric power is generally more readily available. There is no need to provide neither an expensive hydraulic power station, nor hydraulic piping. Also, safety risks and maintenance costs are reduced.

The additional movement of the shutter due to the pressure difference between shaft furnace and hopper is, according to the present invention, absorbed by the transmission means arranged between the output shaft of the electric motor and the tilting shaft. The transmission means has a backlash which is sufficient for allowing the tilting shaft to be rotated by a predetermined amount, without this rotation being transmitted to the output shaft of the electric motor. Thus, the electric motor and the braking device cannot be damaged by the extra movement of the shutter caused by the pressure difference between the shaft furnace and the hopper.

Preferably, the predetermined amount of allowed rotation is between 0.1° and 0.5°, preferably between 0.25° and 0.35°. Such rotation would allow for sufficient movement of the shutter under application of shaft furnace pressure.

The transmission means comprises a gearing mechanism to provide the required backlash. The transmission means may e.g. comprise a planetary gear, helical gear, bevel gear or similar.

Advantageously, the braking device is an electric motor brake.

Preferably, a soft sealing means, e.g. a silicone seal ring, stuffing box, O-ring or the like, is arranged between the shutter and the valve seat, wherein the soft sealing means is compressible under high pressure. The soft sealing means can be configured to allow movement of the shutter by up to about 3 mm.

The present invention also provides a lower sealing valve housing for a shaft furnace charging installation, wherein the housing comprises a sealing valve arrangement as described above, and a valve seat supported by the housing and cooperating with the shutter of the sealing valve arrangement.

Furthermore, the present invention provides a method for operating a sealing valve of a shaft furnace charging installation, wherein the sealing valve comprises a sealing valve arrangement as described above, the method comprising operating the electric motor connected to the tilting shaft so as to bring the shutter into a sealing contact against the valve seat; stopping the electric motor and engaging the braking device so as to stop the output shaft of the electric motor from rotating; and applying outside pressure to an underneath side of the shutter so as to further press the shutter against the valve seat, wherein the tilting shaft is thereby further rotated. The transmission means is configured so as to absorb a further rotation of the tilting shaft without transmitting this further rotation to the output shaft of the electric motor.

Thus, once the shutter has been positioned against the valve seat, the electric motor can be turned off, thereby avoiding unnecessary energy consumption and overheating of the electric motor. Due to the backlash or play in the transmission means, any additional movement of the shutter due to the pressure difference between the shaft furnace and the hopper is absorbed by the transmission means and not transmitted to the electric motor or the braking device.

BRIEF DESCRIPTION OF THE DRAWINGS

A preferred embodiment of the invention will now be described, by way of example, with reference to the accompanying drawings, in which.

DESCRIPTION OF PREFERRED EMBODIMENTS

Generally, a shaft furnace installation comprises a shaft furnace with a shaft furnace charging installation arranged thereabove for feeding charge material into the shaft furnace.

The shaft furnace charging installation may comprise a single hopper. Generally however, two or more hoppers are provided, allowing one hopper to be filled with charge material, while the charge material of another hopper is fed into the shaft furnace. As is well known in the art, each hopper comprises a material gate at the hopper outlet for maintaining the charge material in the hopper or releasing the charge material into the shaft furnace. Each hopper is furthermore equipped with an upper seal valve at the hopper inlet and a lower seal valve at the hopper outlet. These upper and lower seal valves are used to seal off the hopper pressure from atmosphere and from furnace pressure, respectively.

Figure 1:
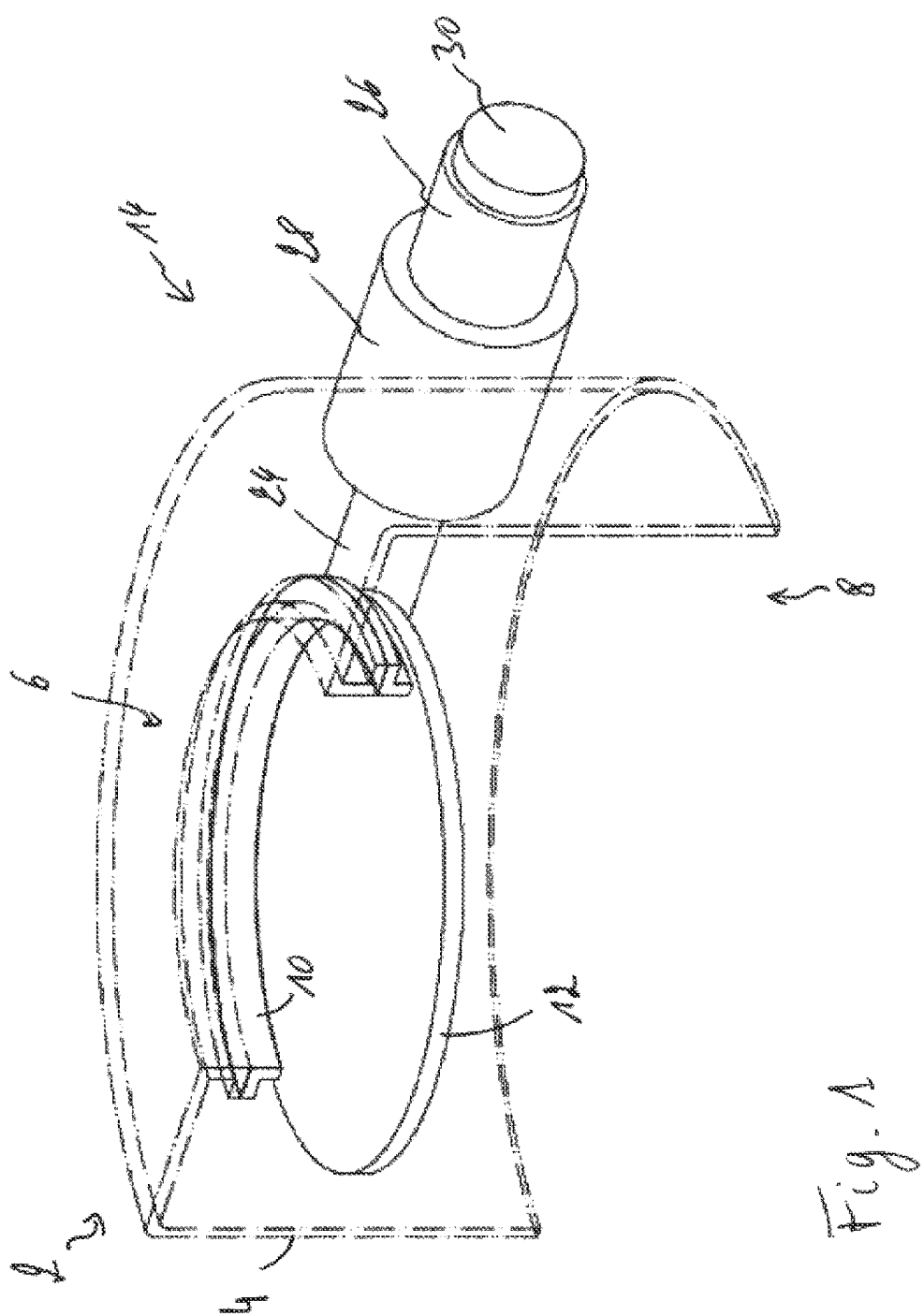
FIG. 1 is a perspective view of a lower seal valve assembly with a sealing valve arrangement according to the invention.
Figure 2:
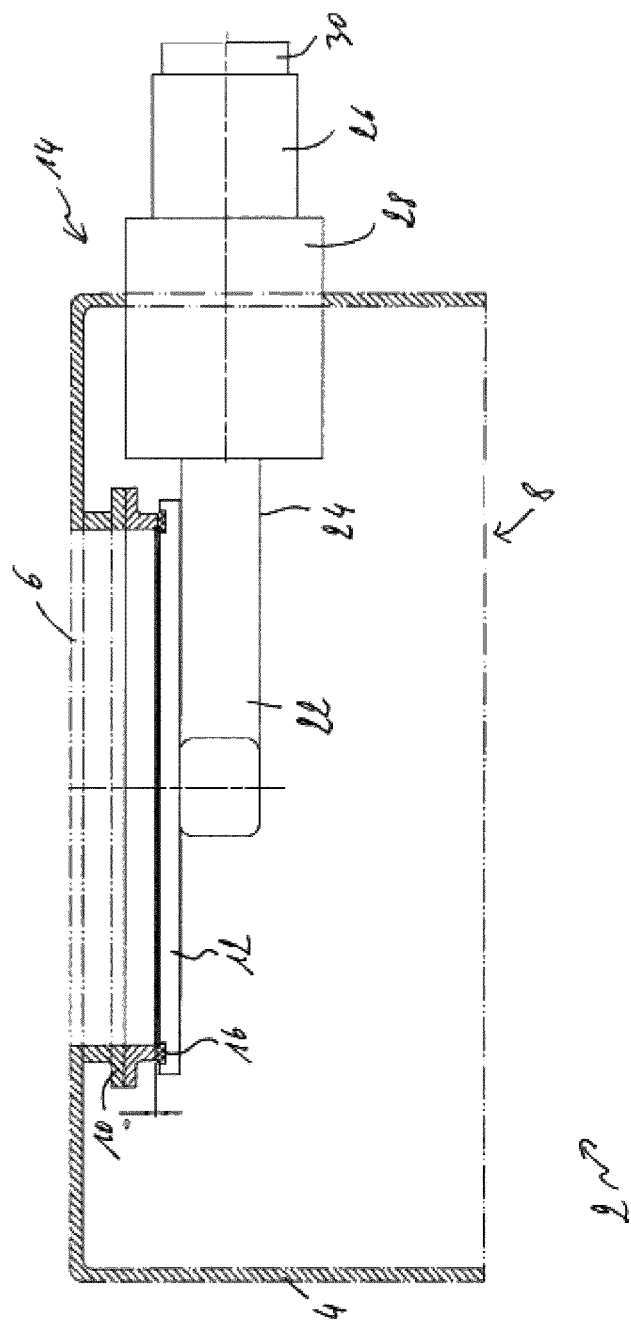
FIG. 2 is a cross-sectional view of the lower seal valve assembly of FIG. 1.

FIGS. 1 and 2 schematically represent a lower seal valve assembly 2 of a shaft furnace charging installation.

Such a lower seal valve assembly 2 comprises a valve housing 4 with an inlet 6 communicating with a hopper outlet and an outlet 8 communicating with a distribution device (not shown) for feeding charge material into the shaft furnace. The charge material received from the hopper via the hopper outlet and that passes through the inlet 6 of the valve housing 4, then passes through the outlet 8 and arrives to the distribution device.

The lower seal valve assembly 2 further comprises an annular valve seat 10 that is situated inside the valve housing 4, and a sealing valve arrangement 14 with a valve closing element, or shutter 12, that is adapted to cooperate with the valve seat 10 for sealing the inlet 6. The shutter 12 is operatively connected to a tilting shaft 24 by means of a support arm 22 in order to move the shutter 12 into and out of contact with the valve seat 10. The sealing valve arrangement 14 is configured to move the shutter 12 between an open position (not shown) and a closed position as seen on FIGS. 1 and 2. The shutter 12 is further equipped with an annular soft sealing means 16, which is, in the embodiment shown, associated with the shutter 12.

The sealing means 16 is to be pressed against a sealing surface on the valve seat 10 for providing gas-tightness. Alternatively, the sealing means 16 may be provided on the valve seat 10.

The sealing valve arrangement 14 further comprises an electric motor 26, a transmission means 28 and a braking device 30. The electric motor 26 comprises an output shaft (not shown) cinematically coupled with the tilting shaft 24 via the transmission means 28.

The electric motor 26 is operated to rotate the tilting shaft 24 so as to move the shutter 12 between the open position and the closed position. The rotation from the open position to the closed position is of an angle comprised between 0 and 100°.

When the shutter 12 is in the closed position, the braking device 30 is engaged and the electric motor 26 is turned off, thereby essentially maintaining the shutter 12 in the closed position. The braking device 30, which may be an electric motor brake, is preferably triggered simultaneously with the electric motor 26 being turned off. It will be understood that a short delay in turning off the electric motor 26 may be tolerated. Such delay should however not exceed a few seconds, preferably not exceed 2 seconds, in order to avoid overheating of the electric motor 26. Similarly, when the shutter 12 is in the open position, the braking device 30 can be engaged and the electric motor 26 can be turned off.

As no voltage is applied to the electric motor 26 while the shutter 12 is maintained in the open or closed position, the electric power consumption of the electric motor 26 can be reduced. Also, heating up of the electric motor 26 can be reduced, thereby avoiding the need for additional cooling of the electric motor 26. Essentially, electric power is only needed while the shutter 12 is to be moved from the open position to the closed position and vice-versa.

The transmission means 28 arranged between the output shaft of the electric motor 26 and the tilting shaft 24 comprises a backlash, or play, configured for having a predetermined amount of allowed rotation between the output shaft of the electric motor 26 and the tilting shaft 24. Thus, even with the braking device 30 engaged when the shutter 12 is in its closed position, certain movement of the shutter 12 is possible. The transmission means 28 may comprise a gearing mechanism, preferably a planetary gear.

As the pressure in the hopper is reduced, the pressure difference between shaft furnace and hopper increases. This increasing pressure difference acts on the underneath side 32 of the shutter 12 and pushes the shutter 12 tighter against the valve seat 10, causing rotational movement of the tilting shaft 24.

However, due to the backlash provided by the transmission means 28, the rotational movement of the tilting shaft 24 caused by the above mentioned pressure difference is absorbed by the transmission means 28 and not transmitted to the output shaft of the electric motor 26, nor to the braking device 30. Thus, the rotational movement of the tilting shaft 24 cannot damage the output shaft of the electric motor 26 which is immobilized by the braking device 30.

LEGEND OF REFERENCE NUMBERS

| | |
|---|---|
| 2 | lower seal valve assembly |
| 4 | valve housing |
| 6 | inlet |
| 8 | outlet |
| 10 | annular valve seat |
| 12 | shutter |
| 14 | sealing valve arrangement |
| 16 | sealing means |
| 22 | support arm |
| 24 | tilting shaft |
| 26 | electric motor |
| 28 | transmission means |
| 30 | braking device |
| 32 | underneath side of shutter |

The invention claimed is:

1. A sealing valve arrangement for a shaft furnace charging installation, said sealing valve arrangement comprising:
    a shutter that cooperates with a valve seat;
    a shutter-actuating device for moving said shutter between a closed position in sealing contact with the valve seat and an open position remote from said valve seat;
    wherein said shutter-actuating device comprises:
    a tilting shaft connected to said shutter;
    an electric motor with an output shaft connected to said tilting shaft, said electric motor disposed between a braking device and said tilting shaft;
    said braking device associated with said electric motor, said braking device being configured for stopping said output shaft of said electric motor from rotating; and
    a transmission means arranged between said output shaft of said electric motor and said tilting shaft, wherein said transmission means comprises a backlash configured for having a predetermined amount of allowed rotation between said output shaft of said electric motor and said tilting shaft, whereby a rotational movement of said tilting shaft is absorbed by the transmission means and not transmitted to said output shaft or to said braking device such that said output shaft is immobilized by said braking device.

2. The sealing valve arrangement according to claim 1, wherein said predetermined amount of allowed rotation is between 0.1° and 0.5°.

3. The sealing valve arrangement according to claim 1, wherein said braking device is an electric motor-brake.

4. The sealing valve arrangement according to claim 1, wherein said predetermined amount of allowed rotation is between 0.25° and 0.35°.

5. The sealing valve arrangement according to claim 1, wherein the shutter is configured to move when the braking device is engaged and the shutter is in the closed position.

6. The sealing valve arrangement according to claim 1, wherein an underneath side of said shutter is configured to receive outside pressure such that said shutter is disposed against said valve seat and said tilting shaft is thereby further rotated.

7. The sealing valve arrangement according to claim 1, wherein said transmission means comprises a gearing mechanism configured to provide the backlash.

8. The sealing valve arrangement according to claim 7, wherein said transmission means comprises a planetary gear, helical gear or bevel gear.

9. The sealing valve arrangement according to claim 1, wherein a soft sealing means is arranged between said shutter and said valve seat, wherein said soft sealing means is compressible under high pressure.

10. The sealing valve arrangement according to claim 9, wherein said soft sealing means is a silicone seal ring.

11. A lower sealing valve housing for a shaft furnace charging installation, said housing comprising
    a sealing valve arrangement according to claim 1, and;
    said valve seat supported by said housing and cooperating with said shutter of said sealing valve arrangement.

12. A method for operating a sealing valve of a shaft furnace charging installation, wherein said sealing valve comprises a sealing valve arrangement according to claim 1, said method comprising:
    operating said electric motor connected to said tilting shaft so as to bring said shutter into a sealing contact against said valve seat;
    stopping said electric motor and engaging said braking device so as to stop said output shaft of said electric motor from rotating;
    applying outside pressure to an underneath side of said shutter so as to further press said shutter against said valve seat, wherein said tilting shaft is thereby further rotated;
    wherein said transmission means is configured so as to absorb a further rotation of said tilting shaft without transmitting this further rotation to said output shaft of said electric motor.

* * * * *